United States Patent Office 2,712,008
Patented June 28, 1955

2,712,008

PRODUCTION OF TERPENELESS ESSENTIAL OILS

Justus G. Kirchner, La Canada, and John M. Miller, South Pasadena, Calif., assignors to the United States of America as represented by the Secretary of Agriculture No Drawing. Application June 29, 1951,
Serial No. 234,432

11 Claims. (Cl. 260—236.6)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the purification of essential oils. In particular, the invention concerns the treatment of essential oils in order to remove the terpenes which are naturally present in such oils. The expression "terpene" used herein is inclusive of sesquiterpenes. By proceeding in accordance with this invention we are enabled to obtain terpeneless essential oils without subjecting the oil to heat or other deleterious conditions.

Essential oils are widely used in perfumes, pharmaceuticals, toilet preparations, and as flavors in food products and beverages. These natural oils contain terpenes and sesquiterpenes which, in general, oxidize readily in the air with the development of unpleasant odors and flavors. In order to alleviate this difficulty, the producers of essential oils have placed on the market the so-called terpeneless and sesquiterpeneless oils. These, for the most part, contain oxygenated compounds which are more stable and contain most of the odor and flavor of the original oil.

Commercially, the terpeneless oils are produced by fractional distillation, by extraction of the oxygenated compounds with dilute alcohol or other solvents, or by a combination of these two methods. These methods, however, have several disadvantages; most notable among these is that the application of heat, in fractional distillation, has a deleterious effect on the flavor and odor of the oil. Further, because of the complex mixtures and the similarity of boiling points of the components of the oils, the terpenes cannot easily be removed quantitatively from the oils, and conversely, some of the oxygenated components are removed with the terpenes. This inadequacy of separation is also typical of the extraction method.

We have found that the terpene constituents can be removed from the essential oils by a technique involving adsorption of the oil on a finely-divided solid adsorbent material followed by selective elution. Our process is particularly characterized by its efficiency in that it gives a sharper separation of the undesired components than does fractional distillation or solvent extraction. Further, in our process, the essential oil is not subjected to heating as required in the usual fractional distillation method.

Briefly described, our process comprises the step of adsorbing the crude essential oil on a finely-divided adsorbent solid material, such as silicic acid. This material containing adsorbed oil is then eluted first with a terpenophilic solvent such as hexane whereby the terpene constituents are selectively eluted from the adsorbent. The adsorbent is then eluted with an oxygenated organic solvent, for example, ethyl acetate. This latter eluate, containing the purified essential oil, is subjected to low-temperature, high vacuum distillation to remove the oxygenated organic solvent from the essential oil which is now free from terpene constituents.

Our process of selective elution depends on the physical or chemical forces of attraction between molecules of adsorbed material and particles of the adsorbent. Thus the terpenes which are hydrocarbon compounds are but weakly attracted to the adsorbent and consequently are readily eluted from the column by the hexane. On the other hand, the non-terpene constituents of the essential oil are oxygenated compounds and are strongly attracted to the adsorbent. Thus the hexane does not have the ability to counteract this strong attractive force and these non-terpene constituents remain in the column. In the second stage of the process when the column is eluted with ethyl acetate, this solvent has a greater attraction for the non-terpene constituents than these have for the adsorbent and consequently these non-terpenes are eluted by the ethyl acetate.

The following examples demonstrate our invention in greater detail. It is understood that these examples are furnished solely by way of illustration and not limitation.

EXAMPLE I

A. *Preparation of adsorbent column.*—One hundred and thirty-six grams of finely-divided silicic acid was mixed with approximately 400 ml. of hexane and the mixture poured into a Tswett tube 2 1/16" in diameter. This tube had an outlet at the bottom which protruded into a receiver flask, this flask being provided with a side arm for attachment to a source of vacuum. Vacuum was applied to the receiver to remove excess hexane to the level of the adsorbent—this left a column of hexane-wetted silicic acid 3.3 in. in height.

B. *Adsorption of oil on column.*—One hundred grams of cold-pressed orange peel oil was carefully poured on top of the column and drawn by application of the vacuum into the adsorbent.

C. *Elution of terpenes.*—Six hundred and twenty-five milliliters of hexane was then added on top of the column and drawn through the adsorbent by application of the vacuum. Samples of the eluate were taken frequently, spotted on chromatostrips (glass plates coated with a mixture of an adsorbent material and a binder), and sprayed with 0.05% fluorescein and exposed to bromine vapors. At the first positive test (yellow spot on pink background), indicative of the presence of terpenes, the receiver was changed and the terpene-hexane solution collected. As soon as the eluate samples were negative to this test, the vacuum was disconnected to discontinue flow of the hexane. A total of 625 ml. of the terpene-hexane solution was collected. The hexane was removed by distillation at 12 mm. Hg absolute at 0° C. The yield of terpenes was 90.7 grams. It was found by analysis that this product did not contain any of the non-terpene constituents of the peel oil.

D. *Elution of purified essential oil.*—A quantity of ethyl acetate (about 800 ml.) was poured on top of the column and the vacuum applied to the receiver to draw this solvent through the adsorbent. Samples of the eluate were taken frequently, spotted on chromatostrips, then sprayed with fluorescein and bromine. At the first positive test (yellow spot on pink background), indicative of the presence of the essential oil, the receiver was changed and the solution of terpeneless essential oil in ethyl acetate was collected. A total of 700 ml. of this solution was obtained. The ethyl acetate was distilled at 7 mm. of Hg absolute at 0° C. to obtain 4 grams of the terpeneless orange peel oil.

EXAMPLE II

A series of different essential oils were subjected to a purification treatment similar to that described in Example I. In each case a 100 gram sample of the essential oil was used and the adsorbent was silicic acid. The amounts of materials used and the results obtained are summarized in the table below. In each case it was found that the purified essential oil was free from terpenes and the terpene fraction was free from essential oil.

TABLE

*Data on purification of 100 gram samples of essential oils*

| Essential oil | Amount of silicic acid, grams | Amount of hexane, ml. | Amount of ethyl acetate, ml. | Yield of terpene-less essential oil, grams | Yield of terpenes, grams |
| --- | --- | --- | --- | --- | --- |
| Grapefruit (cold pressed) | 151 | 584 | 646 | 16.5 | 74.0 |
| Lemon (cold pressed) | 108 | 738 | 372 | 6.0 | 88.8 |
| Clove | 590 | 770 | 1,387 | 74.5 | 26.2 |
| Peppermint | 600 | 2,315 | 2,945 | 67.5 | 21.4 |
| Petitgrain (Paraguay) | 800 | 710 | 1,700 | 83.5 | 8.1 |
| Bay | 700 | 645 | 620 | 74.0 | 20.0 |
| Cedarwood | 382 | 832 | 732 | 28.8 | 65.8 |

EXAMPLE III

One hundred grams of finely-divided silicic acid was mixed with 500 ml. of hexane and thoroughly stirred. To this mixture was added with stirring, 100 grams of cold-pressed lemon peel oil. This mixture was poured into a 2 1/16" i. d. Tswett tube having a 1/2" pad of fresh silicic acid deposited at the bottom. The vacuum was applied to the receiver until the hexane solution had been drawn to the level of the adsorbent. One hundred ml. of hexane was then drawn through the adsorbent. A total volume of 575 ml. of terpene-hexane solution was obtained. On evaporation of the solvent, 92 grams of terpenes was obtained.

Three hundred milliliters of acetone was then drawn through the adsorbent to elute the non-terpene essential oil. The collected acetone solution was mixed with an equal volume of water and allowed to stand. Two layers separated. The oil layer, having a volume of 120 ml., was removed, dried over anhydrous sodium sulphate, and residual solvent removed by vacuum distillation. A yield of 5.5 grams of purified essential oil was obtained. Both the purified essential oil and the recovered terpenes were subjected to chromatographic analyses and it was found that the purified essential oil was free from terpenes and the terpene fraction was free from oxygenated constituents.

EXAMPLE IV

Forty grams of finely-divided silicic acid was made into a slurry with 160 ml. of hexane and 25 grams of cold pressed orange peel oil was mixed therein. After stirring, the slurry was centrifuged and 116 ml. of hexane solution was poured off. The adsorbent was re-slurried with 100 ml. of hexane and again centrifuged, 96 ml. of hexane solution being poured off. The combined hexane fractions were evaporated and 20 grams of terpenes free of non-terpenes was obtained. The centrifuged adsorbent was slurried with 130 ml. of ethyl acetate and then centrifuged. The ethyl acetate solution was poured off and from this was recovered by vacuum distillation 4.65 grams of essential oil containing some terpenes. By comparison with the original oil, it was found that the purified oil contained only 17% of its original terpene content.

In carrying out our process in practice we usually prefer to conduct the adsorption and elutions on a column. To this end a cylinder is packed with a finely-divided solid adsorbent. Although we prefer to use silicic acid, various other adsorbents can be employed as for example, alumina, silica, magnesium oxide, magnesium hydroxide, aluminum hydroxide, bentonite, clays, diatomaceous earths, and so forth. Preferably this column is then wetted with the terpenophilic solvent whereby to minimize isomerization of reactive compounds present in the essential oil. The expression "terpenophilic solvent" as used herein means an organic solvent which has a greater affinity for terpenes than the latter have affinity for the adsorbent. As the terpenophilic solvent, we prefer to use hexane although many other materials within this class give good results, examples being carbon disulphide, carbon tetrachloride, and mixtures of hydrocarbons such as gasoline, petroleum naphtha, petroleum ether, benzine, and so forth. Preferably the terpenophilic solvent should have a boiling point below 100° C. to facilitate its removal by distillation from the separated terpenes. The essential oil to be purified is then applied to the adsorbent column. By application of vacuum to the receiver attached to the bottom of the column the oil can be drawn into the adsorbent. If desired, pressure can be applied at the top of the column to force the oil into the adsorbent. The column is then ready for elution of the terpene constituents. This is accomplished by washing the column with hexane or other terpenophilic solvent as described above. In conducting this elution, it is preferable to pass the selected solvent through the adsorbent column while taking small samples of the effluent liquid and subjecting them to chromatographic or other analytical tests. By this means, one can ascertain when the effluent contains the terpenes. The terpene-containing effluent can then be collected and saved for recovery of terpenes. By continuing the tests, the point when the effluent no longer contains terpenes can also be determined. At this point the collection of the solvent can be discontinued and the column is ready for elution of the essential oil. The total amount of terpenophilic solvent to be used will vary depending on the amount of adsorbent and amount of terpenes in the crude essential oil. In any case by using the tests on the effluent liquor, the proper amount of solvent to use can be determined for each particular case.

The terpenes may be recovered from the effluent solution by distillation. Vacuum distillation is preferred to minimize decomposition of the terpenes.

In conducting the elution of the purified essential oil, the adsorbent column is washed with ethyl acetate or other oxygenated organic solvent such as diethyl ether, dioxane, acetone, ethanol, and so forth. With the exception of the different solvent, this elution is carried out just as is the elution of the terpenes. As above noted, samples of the effluent are taken at frequent intervals to determine by chromatographic or other analytical tests the presence or absence of the essential oil in the effluent. By so doing the fraction of effluent containing the essential oil can be collected separately thus to minimize the amount of solvent to be removed from the product. The total amount of solvent will vary depending on the amount of adsorbent material and the amount of non-terpenes in the essential oil. In general, by conducting the tests on the effluent liquors the proper amount of solvent to be used in any particular case can be determined.

The terpeneless essential oil can be recovered from the effluent solution by distillation preferably under high vacuum, at or below room temperature to prevent decomposition of the delicate oils. Where the oxygenated organic solvent is at least partially miscible in water, a simple method of separating most of the solvent involves adding water to the effluent liquid whereupon the oil is thrown out of solution and collects as a separate layer on the aqueous solution. Residual solvent can be separated from the oil phase by vacuum distillation, the oil phase being preferably dried first.

In conducting the elutions we usually prefer to draw the eluting solvent through the column by application of vacuum to the bottom of the column. It is obvious however that pressure may be applied to the top of the column to obtain the same effect.

Although we prefer to conduct the adsorption and elutions on a column of the adsorbent material, such a technique is not critical. Thus the adsorbent may be slurried with the terpenophilic solvent and the crude essential oil mixed therewith. This slurry is then centrifuged and the solvent removed. The adsorbent is then re-slurried with additional amounts of terpenophilic solvent, the solvent being removed each time by centrifuging. This is continued until essentially all the terpenes are eluted. The adsorbent is then slurried with the oxygenated organic solvent and the mixture centrifuged and the esesntial oil-solvent solution removed. It is further evident that instead of centrifuging, filtration can be used to isolate the adsorbent from either the terpenophilic solvent or oxygenated solvent eluates.

The terpeneless essential oils produced in accordance may be used for any of the purposes for which essential oils are employed as in perfumes, pharmaceuticals, toilet preparations, food products, beverages, etc. The terpeneless citrus oils are especially adapted for use as flavor-fortifying agents for concentrated citrus juices. Thus in normal evaporation techniques used in preparing concentrated citrus juices, much of the flavoring components of the juice are volatilized and lost with the result that the concentrate lacks a well rounded flavor as compared with the natural juice. To produce a more characteristically flavored product one may add a small proportion of terpeneless citrus oil to the concentrate to restore the natural bouquet. The proportion of oil to be added will vary depending on the degree of concentration. In most cases, such an amount of the terpeneless oil should be added to provide an amount equivalent to about from 0.0002 to 0.001 percent by volume in the final reconstituted juice. Thus in dealing with a fourfold concentrate one would add about from 0.0008 to 0.004% of the terpeneless oil whereupon the reconstituted juice would contain the proper amount of the added oil. This concentrated, flavor-fortified product would then be packaged and frozen in the manner customary with conventional frozen juice concentrates. The terpeneless citrus oils produced in accordance with this invention are superior to untreated citrus peel oil because the odor and flavor of the oil is contained in the non-terpene fraction; the terpene fraction contributes little if any desirable qualities. In addition, the terpene fraction is considerably more unstable toward oxidative changes so that its removal should contribute to the flavor and odor stability of the product fortified with the terpeneless oil.

Having thus described our invention, we claim:

1. The process which comprises adsorbing a crude essential oil on a solid adsorbent material, eluting the adsorbent material with a terpenophilic solvent to remove the terpene constituents of the essential oil, eluting the adsorbent material with an oxygenated organic solvent to remove the non-terpene constituents of the essential oil, and recovering a substantially terpeneless essential oil from the oxygenated organic solvent eluate.

2. The process of claim 1 wherein the crude essential oil is orange peel oil.

3. The process of claim 1 wherein the crude essential oil is lemon peel oil.

4. The process of claim 1 wherein the crude essential oil is grapefruit peel oil.

5. The process of claim 1 wherein the crude essential oil is clove oil.

6. The process of claim 1 wherein the crude essential oil is peppermint oil.

7. The process which comprises adsorbing a crude citrus oil on silicic acid, eluting the silicic acid containing adsorbed oil with a terpenophilic solvent to remove the terpene constituents of the essential oil, eluting the so-treated silicic acid with an oxygenated organic solvent to remove the non-terpene constituents of the essential oil, and recovering a substantially terpeneless essential oil from the oxygenated organic solvent eluate.

8. The process of claim 7 wherein the terpenophilic solvent is hexane.

9. The process of claim 7 wherein the oxygenated organic solvent is ethyl acetate.

10. The process of claim 7 wherein the oxygenated organic solvent is acetone.

11. The process which comprises adsorbing a crude essential oil on a solid adsorbent material, eluting the adsorbent material with hexane to remove the terpene constituents of the essential oil, eluting the adsorbent material with ethyl acetate to remove the non-terpene constituents of the essential oil, and recovering a substantially terpeneless essential oil from the ethyl acetate eluate.

References Cited in the file of this patent

UNITED STATES PATENTS

| | | |
|---|---|---|
| 1,786,630 | Reid | Dec. 30, 1930 |
| 2,059,828 | Verley | Nov. 3, 1936 |
| 2,282,808 | Musher | May 12, 1942 |
| 2,296,004 | Platt | Sept. 15, 1942 |
| 2,631,145 | Othmer et al. | Mar. 10, 1953 |

FOREIGN PATENTS

| | | |
|---|---|---|
| 255,346 | Great Britain | July 23, 1926 |
| 292,667 | Great Britain | June 21, 1928 |
| 486,347 | Great Britain | June 2, 1938 |

OTHER REFERENCES

Chem. Abstracts, 42, 1101 (1948).